Figure 1:
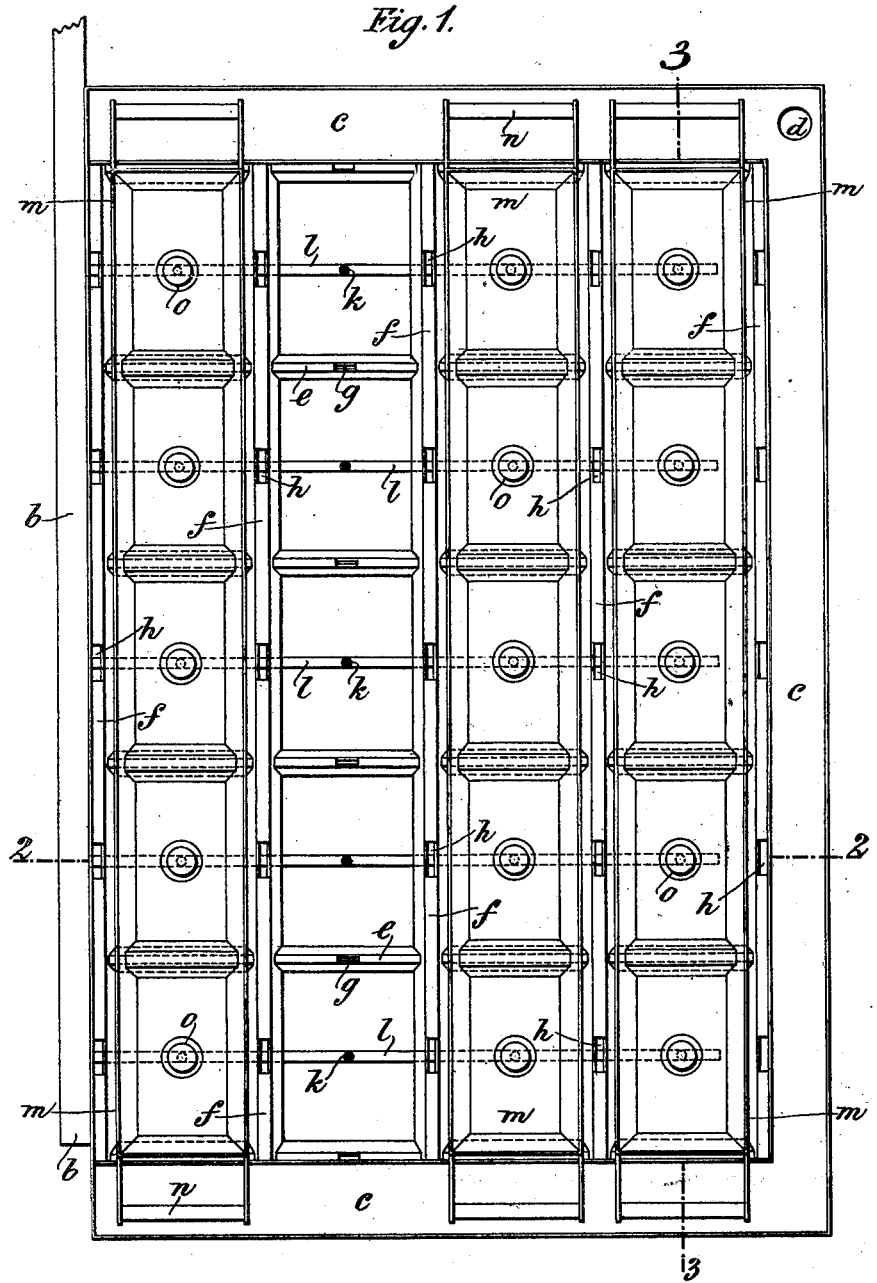

No. 695,907. Patented Mar. 25, 1902.
G. F. BUCKINGHAM.
APPARATUS FOR MANUFACTURING BLOCKS OF ICE.
(Application filed June 24, 1901.)

(No Model.) 3 Sheets—Sheet 1.

Witnesses. Inventor.

No. 695,907. Patented Mar. 25, 1902.
G. F. BUCKINGHAM.
APPARATUS FOR MANUFACTURING BLOCKS OF ICE.
(Application filed June 24, 1901.)
(No Model.) 3 Sheets—Sheet 2.
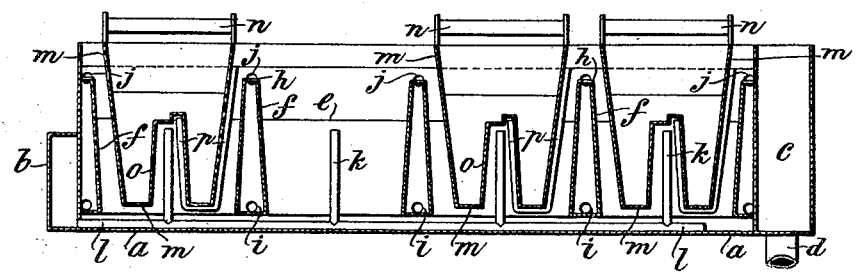
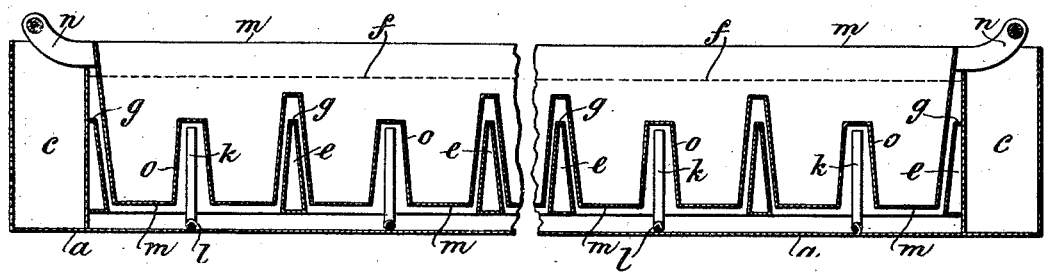
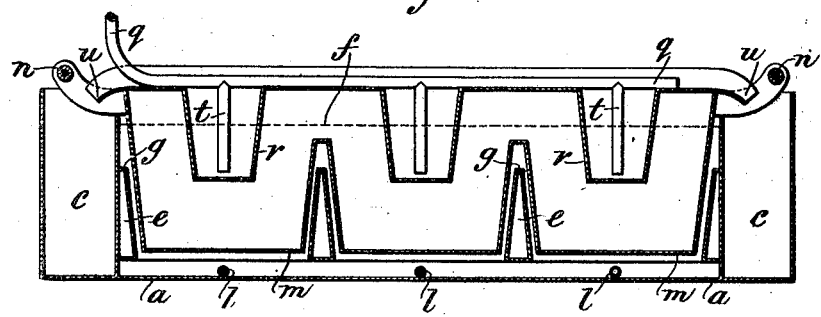

No. 695,907. Patented Mar. 25, 1902.
G. F. BUCKINGHAM.
APPARATUS FOR MANUFACTURING BLOCKS OF ICE.
(Application filed June 24, 1901.)
(No Model.) 3 Sheets—Sheet 3.
Fig. 3.ˣ
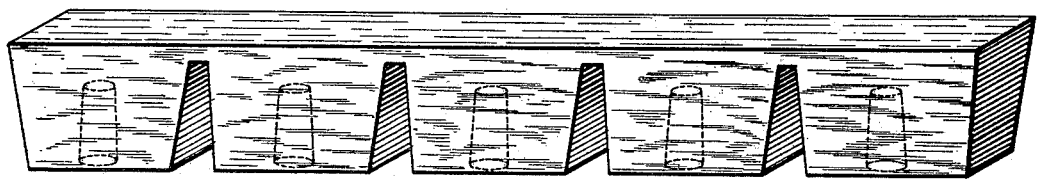
Witnesses.
Inventor:
George Frederick Buckingham,
By his Attorneys,

UNITED STATES PATENT OFFICE.

GEORGE FREDERICK BUCKINGHAM, OF LONDON, ENGLAND.

APPARATUS FOR MANUFACTURING BLOCKS OF ICE.

SPECIFICATION forming part of Letters Patent No. 695,907, dated March 25, 1902.

Application filed June 24, 1901. Serial No. 65,853. (No model.)

*To all whom it may concern:*

Be it known that I, GEORGE FREDERICK BUCKINGHAM, clerk, a subject of the King of Great Britain, residing at 31 Mecklenburgh Square, London, England, have invented certain new and useful Improvements in Apparatus for Manufacturing Blocks of Ice, of which the following is a specification.

The mold consists of a trough having hollow partitions across it, such partitions not reaching quite to the top, so that when the mold is filled with water and frozen the resulting ice is in the form of a number of blocks connected by a slab. A number of such molds are hung from their ends side by side in a trough, which is somewhat deeper than the molds, so that a space is left below their bottoms, and their sides are preferably inclined, so that longitudinal passages are left between them, or the mold may be in the form of a tray having both transverse and longitudinal hollow partitions. Brine is introduced into the trough and circulates therein through the various passages.

Figure 1 is a plan of an apparatus constructed according to this invention, and Figs. 2 and 3 are sections on the lines 2 2 and 3 3, Fig. 1. Fig. 3× is a perspective view of the block of ice produced. Fig. 4 is a longitudinal section of a modification.

In Figs. 1 to 3, $a$ is a trough having on one side a supply-pipe $b$ and on the other three sides a channel $c$, provided with an outlet-pipe $d$. Above the bottom of the trough $a$ are hollow ridges $e f$, connected together and forming transverse and longitudinal passages having slots $g$ and $h$, respectively, in their tops. The passages $f$ are higher than the passages $e$ and their ends have in them small holes $i j$, opening into the channel $c$. $k$ represents stand-pipes connected by pipes $l$ to the supply-pipe $b$. $m$ represents the molds, each consisting of a number of compartments separated by partitions which do not reach to the top of the molds. These molds are supported by handles $n$, which rest on the partitions between the trough $a$ and channel $c$. These molds may be connected together or be separate, as shown in the drawings. In Figs. 1 and 2 three out of the four molds are in place. At the center of the bottom of each compartment of each mold is a conical indentation $o$, corresponding to the stand-pipes $k$, and leading from each of these indentations is an air-escape pipe $p$. The molds are filled with water to be frozen up to about the level of the tops of the ridges $f$, (shown by the dotted line in Figs. 3 and 4,) and cold brine supplied by the pipe $b$, overflowing from the tops of the stand-pipes $k$, fills the spaces between the sides of the compartments of the molds and the passages $e$ and $f$ and overflows through the slots $g$ into the passages $e$ and $f$, and part of it flows through the holes $i$ into the channel $c$ and waste-pipe $d$. The holes $i$ are not, however, large enough to carry off the whole supply, and the brine therefore rises in the passages $f$ and through the slots $h$ and escapes through the holes $j$ and over the partition between the trough $a$ and channel $c$.

In Fig. 4 the stand-pipes $k$ and indentations $o$ are omitted, the pipes $l$ being perforated under the center of the compartments of the molds. The apparatus may be still further simplified by omitting the passages $e$ and $f$ and holes $i$ and $j$, the brine overflowing over the partition between $a$ and $c$; but this is not desirable, the arrangement shown in Figs. 1 to 3 being preferred. Fig. 4 also shows the way in which the indentations $o$ in the bottoms of the molds may be replaced by hollow vessels $r$, dipping into the water in them. These vessels are independently supplied with brine by the pipe $q$ and branch pipes $t$, the brine overflowing at $u$ into the channel $c$, and the vessels may be agitated, if desired.

What I claim is—

1. The combination of a trough, longitudinal and transverse passages at the bottom of the trough, a brine-supply to the trough, an overflow from it into the passages and a mold consisting of a number of separate compartments connected together at the top suspended in it.

2. The combination of a trough, brine-supply pipes standing up from the bottom of the trough, an overflow from the trough, a mold consisting of a number of separate compartments connected together at the top suspended in the trough and an indentation in the bottom of each compartment corresponding to the stand-pipes.

3. The combination of a trough, brine-supply pipes standing up from the bottom of the trough, longitudinal and transverse passages at the bottom of the trough, an overflow from the trough into the passages, a mold consisting of a number of separate compartments connected together at the top suspended in the trough and an indentation in the bottom of each compartment corresponding to the stand-pipes.

GEORGE FREDERICK BUCKINGHAM.

Witnesses:
ROBERT ELLSWORTH,
J. A. MACDONALD.